(12) United States Patent
Abdrashitov et al.

(10) Patent No.: US 10,467,822 B2
(45) Date of Patent: Nov. 5, 2019

(54) REDUCING COLLISION-BASED DEFECTS IN MOTION-STYLIZATION OF VIDEO CONTENT DEPICTING CLOSELY SPACED FEATURES

(71) Applicant: Adobe Inc., San Jose, CA (US)

(72) Inventors: Rinat Abdrashitov, Toronto (CA); Jose Ignacio Echevarria Vallespi, San Jose, CA (US); Jingwan Lu, San Jose, CA (US); Elya Shectman, Seattle, WA (US); Duygu Ceylan Aksit, San Jose, CA (US); David Simons, Seattle, WA (US)

(73) Assignee: Adobe Inc., San Jose, CA (US)

( * ) Notice: Subject to any disclaimer, the term of this patent is extended or adjusted under 35 U.S.C. 154(b) by 32 days.

(21) Appl. No.: 15/899,503

(22) Filed: Feb. 20, 2018

(65) Prior Publication Data
US 2019/0259214 A1    Aug. 22, 2019

(51) Int. Cl.
| | |
|---|---|
| *G06K 9/00* | (2006.01) |
| *G06T 19/20* | (2011.01) |
| *G06T 13/40* | (2011.01) |
| *G06T 7/246* | (2017.01) |
| *G06F 3/01* | (2006.01) |

(52) U.S. Cl.
CPC ............. *G06T 19/20* (2013.01); *G06T 7/251* (2017.01); *G06T 13/40* (2013.01); *G06F 3/011* (2013.01); *G06K 9/00248* (2013.01); *G06K 9/00281* (2013.01); *G06T 2207/30201* (2013.01); *G06T 2210/21* (2013.01)

(58) Field of Classification Search
None
See application file for complete search history.

(56) References Cited

PUBLICATIONS

Chenney et al. (Simulating Cartoon Style Animation, ACM, 2002) (Year: 2002).*
Klaudiny, Martin, et al., "Real-Time Multi-View Facial Capture With Synthetic Training", Computer Graphics Forum, Eurographics, vol. 36, No. 2, Apr. 2017, 12 pages.
(Continued)

*Primary Examiner* — Kyle Zhai
(74) *Attorney, Agent, or Firm* — Kilpatrick Townsend & Stockton LLP

(57) ABSTRACT

Embodiments involve reducing collision-based defects in motion-stylizations. For example, a device obtains facial landmark data from video data. The facial landmark data includes a first trajectory traveled by a first point tracking one or more facial features, and a second trajectory traveled by a second point tracking one or more facial features. The device applies a motion-stylization to the facial landmark data that causes a first change to one or more of the first trajectory and the second trajectory. The device also identifies a new collision between the first and second points that is introduced by the first change. The device applies a modified stylization to the facial landmark data that causes a second change to one or more of the first trajectory and the second trajectory. If the new collision is removed by the second change, the device outputs the facial landmark data with the modified stylization applied.

20 Claims, 8 Drawing Sheets

(56) References Cited

PUBLICATIONS

Coleman, Patrick, et al., "Staggered Poses: A Character Motion Representation for Detail-Preserving Editing of Pose and Coordinated Timing", Eurographics/ACM Siggraph Symposium on Computer Animation, 2008, 10 pages.
Fiser, Jakub, et al., "Example-Based Systhesis of Stylized Facial Animations", ACM Transactions on Graphics, vol. 36, No. 4, Article 155, Jul. 2017, 11 pages.
Wang, Ju, et al., "The Cartoon Animation Filter", ACM Transactions on Graphics—Proceedings of ACM Siggraph, vol. 25, Issue 3, Jul. 2006, 5 pages.
Amos, Brandon, et al, "OpenFace: A General-Purpose Face Recognition Library With Mobile Applications", School of Computer Science, CMU-CS-16-118, Jun. 2016, 20 pages.
Blanco, Roger, et al., "Facial Retargeting With Automatic Range of Motion Alignment", ACM Transactions on Graphics, vol. 36, No. 4, Article 154, Jul. 2017, 12 pages.
Kwon, Ji-Yong, et al, "An Animation Bilateral Filter for Slow-In and Slow-Out Effects", Science Direct, Graphical Models, vol. 73, Issue 5, Sep. 2011, 4 pages.
Baltrusaitis, Tadas, et al., "Cross-Dataset Learning and Person Specific Normalisation for Automatic Action Unit Detection", IEEE Xplore, Oct. 2015, 6 pages.
Wood, Erroll, et al., "Rendering of Eyes for Eye-Shape Registration and Gaze Estimation", arXiv: 1505.05916v1, cs.CV, May 2015, 9 pages.
Baltrusaitis, Tadas, et al., "Constrained Local Neural Fields for Robust Facial Landmark Detection in the Wild", IEEE Xplore, Mar. 2014, 6 pages.
Baltrusaitis, Tadas, et al., "OpenFace: An Open Source Facial Behavior Analysis Toolkit", IEEE Xplore, May 2016, 10 pages.

\* cited by examiner

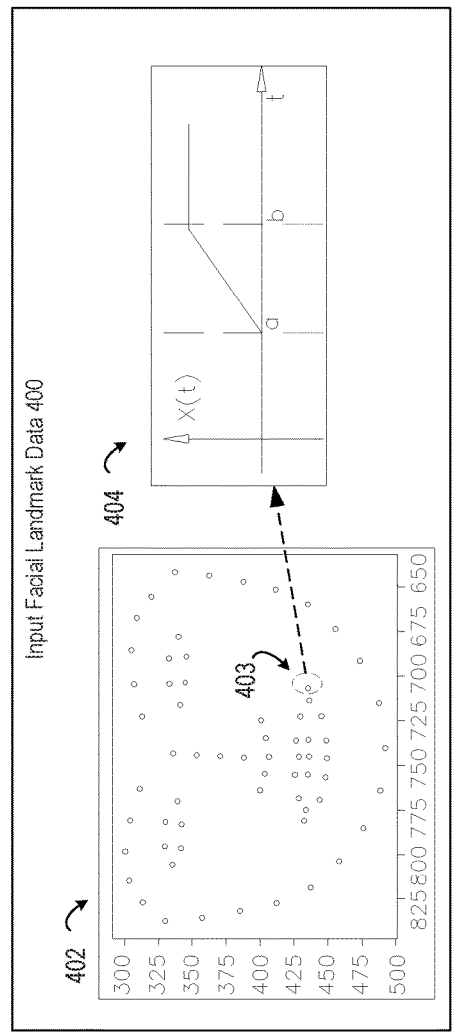
FIG. 4
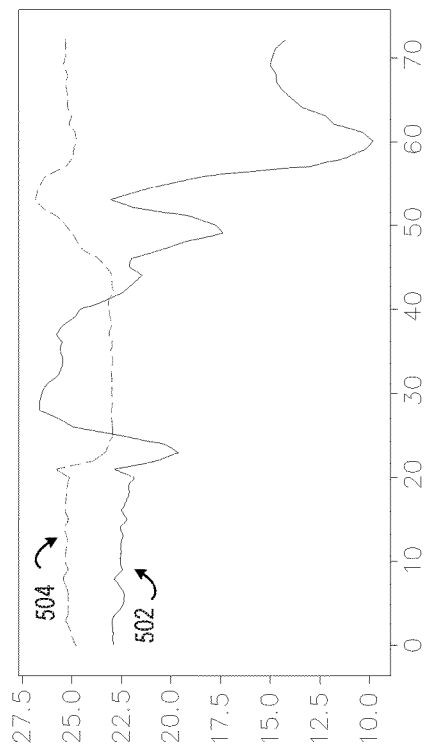
FIG. 5
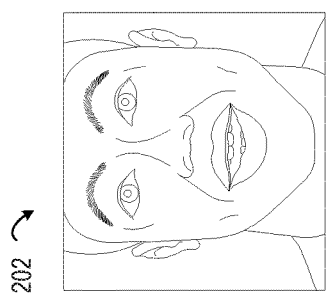

REDUCING COLLISION-BASED DEFECTS IN MOTION-STYLIZATION OF VIDEO CONTENT DEPICTING CLOSELY SPACED FEATURES

TECHNICAL FIELD

This disclosure relates generally to the field of image processing that transforms video content through stylization and thereby enhancing visual quality of the video content. More specifically, but not by way of limitation, this disclosure relates to reducing collision-based defects in motion-stylization of video content by recognizing features in the video content (e.g., facial features) and preventing stylization operations from creating new intersections (or other collisions) between landmark points in different, closely-spaced features (e.g., different facial features).

BACKGROUND

Media content frequently uses animated virtual characters. Manually generating and animating these virtual characters in an interesting manner involves subjective judgments by animators, who rely on trial-and-error and varying amounts of expertise to depict animated characters in an aesthetically desirable manner. To automate this process, content creation applications are used to generate animated virtual characters.

One example of a content creation application is a motion-capture system. A motion-capture system records a live performance by an actor who performs various movements. The recorded performance is applied to a virtual character, thereby animating the virtual character. Motion capture systems apply levels of nuance to virtual characters similar to the nuances that would exist in live performances, thereby increasing the realism of the animated character.

However, these existing solutions for animating virtual characters present disadvantages. For example, while motion capture systems are helpful for animating realistic characters, such as a virtual character that is intended to depict a normal human being, these systems often have limited utility when applied to non-realistic characters, such as a fantastical creature whose movements are modeled by an actor. Non-realistic characters show varying degrees of stylization in their appearance and are therefore expected to behave in non-realistic stylized ways.

Thus, existing solutions may involve disadvantages for reasons such as (but not limited to) those described above.

SUMMARY

Certain embodiments involve reducing collision-based defects in stylization of video content depicting faces. For example, a device obtains facial landmark data from video data, wherein the facial landmark data includes a first trajectory traveled by a first point tracking one or more facial features, and a second trajectory traveled by a second point tracking one or more facial features. The device applies a stylization to the facial landmark data that causes a first change to one or more of the first trajectory and the second trajectory. The device also identifies a new collision between the first point and the second point that is introduced by the first change. The device applies a modified stylization to the facial landmark data that causes a second change to one or more of the first trajectory and the second trajectory. If the new collision is removed by the second change, the device outputs the facial landmark data with the modified stylization applied.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 depicts an example of input facial landmark data from input video content used by the process of FIG. 3, according to certain embodiments of the present disclosure.

FIG. 5 depicts an example of corrected face orientation data resulting from pre-processing that could be performed in the process depicted by FIG. 3, according to certain embodiments of the present disclosure.

DETAILED DESCRIPTION

Figure 1:
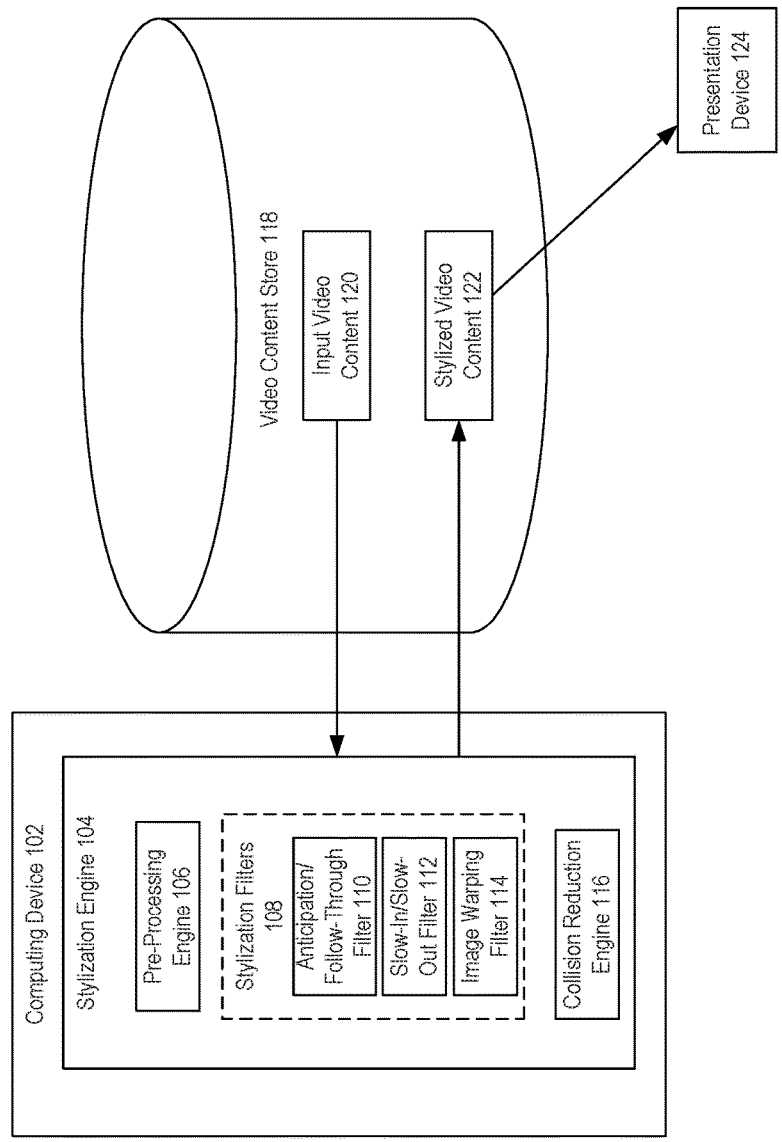
FIG. 1 depicts an example of a video stylization system for reducing collision-based defects in stylization of video content depicting faces, according to certain embodiments of the present disclosure.

The present disclosure includes systems and methods for reducing collision-based defects in stylization of video content depicting faces or other closely spaced character features. Some embodiments address deficiencies of certain existing techniques, which may be unsuitable for automating the animation of stylized virtual character. For example, a stylization engine applies one or more stylization filters to video content depicting a face. These stylization filters modify the trajectories traveled, over the duration of the video, by key points defining a feature (e.g., a point that partially defines a mouth) and thereby provide an intentionally exaggerated or distorted version of the feature's movement. Furthermore, the stylization engine performs additional processing to avoid sub-optimal stylization that could result from simultaneously stylizing two proximate features that could inadvertently cause these features to collide (e.g., inadvertently overlapping an eye and a mouth or other facial features). For example, the stylization engine iteratively evaluates the modified trajectories to identify a collision between the trajectories that is introduced by the stylization. The stylization engine is used to modify one or more parameters of the stylization filters based on detecting the new collision, thereby removing the collision in subsequent iterations. Thus, certain embodiments facilitate the animation of stylized virtual characters (e.g., film characters, virtual puppets, etc.) by applying stylizations to motion capture operations without introducing defects into closely located features (e.g., facial features) of the character. In some embodiments, closely spaced features can be features that are closer to one another than other features, or are otherwise spaced closely enough that collisions could result from stylization The following non-limiting example is provided to introduce certain embodiments. In this example, a content creation application executed by one or more processing devices accesses video data depicting a face (e.g., a video file or camera stream generated with a motion-capture system). The content creation application obtains facial landmark data from the video data. For instance, landmarks are points along various curves that collectively define the face as captured in the video. Different groups of landmarks are associated with different semantic features (e.g., landmarks 1-5 are associated with a left eye, landmarks 6-10 are associated with a right eye, etc.). The landmark data also includes trajectories traveled by various landmarks over a time period in which motion of the face was captured. Frames of the video data depict changes in facial expressions over time, where different points in facial features travel along different trajectories. For instance, in a set of frames depicting a change from a smile to a frown, a first point along an "upper lip" feature will move along a first trajectory and a second point along a "lower lip" feature will move along a second trajectory.

Continuing with this example, the content creation application iteratively applies one or more stylization operations to the facial landmark data and adjusts the applied stylization. Examples of stylization operations include an "anticipation/follow-through" effect in which exaggerated starting or ending motions are added to a feature's movement along a path, a "slow-in/slow-out" effect in which important movements in the video are slowed down for emphasis, etc. A stylization operation applies a filter to one or more trajectories that cause one or more changes in these trajectories (e.g., exaggerating starting or ending motions, removing jitter in certain motions, etc.). The content creation application adjusts one or more parameters of a stylization operation if the stylization operation introduces a new collision between two or more points in the facial landmark data. For instance, if the original facial landmark data depicts a lip movement in which the upper lip never crosses the lower lip, the stylization could introduce a collision by changing a first path of a first point along the "upper lip" feature so that the first path intersects a second path of a second point along the "lower lip" feature. The content creation application therefore adjusts one or more parameters of a stylization operation (e.g., a filter weight or other parameter) so that the newly introduced collision is removed. The content creation application outputs (e.g., to an end-user, to another process, etc.) the stylized facial landmark data if the stylization operation has been successfully adjusted to avoid these types of newly introduced collisions.

As described herein, certain embodiments provide improvements in computer animation by automatically applying various rules of a particular type (e.g., stylization filters subject to collision-detection procedures). For example, these embodiments correct errors that may occur when applying stylization filters (i.e., collisions), thereby making stylization operations more suitable for application to motion-capture data that animates virtual characters. These embodiments allow computerized stylization operations to be applied to motion-capture technology, thereby enhancing the benefits of motion-capture technology (i.e., automating the subjective, manual determinations of animators) by overcoming the limitations of such technology (i.e., inapplicability to highly stylized characters). Thus, embodiments described herein improve computer-implemented processes for animating graphics, thereby providing a more suitable solution for automating tasks previously performed by humans.

Example of an Operating Environment for Video Stylization with Collision Avoidance Referring now to the drawings, FIG. 1 depicts an example of a video stylization system 100 for reducing collision-based defects in stylization of video content depicting faces. The video stylization system 100 includes a set of communicatively coupled components. These components include a computing device 102 that executes a stylization engine 104, a video content store 118 that stores input video content 120 and stylized video content 122, and a presentation device 124 that displays or otherwise presents the stylized video content 122 to a user.

The computing device 102 includes one or more processing devices. These processing devices can be included in the same device as the presentation device 124 or be located remotely from the presentation device 124. The video content store 118 includes one or more memory devices having data structures for accessing the input video content 120, the stylized video content 122, or both stored thereon. The presentation device 124 includes one or more inputs, one or more output devices, or some combination thereof for displaying, presenting, or otherwise interacting with the stylized video content 122 and, in some cases, the input video content 120. In some embodiments, the presentation device 124 includes one or more of dedicated processors, input devices, audio or tactile output devices, etc.

Figure 2:
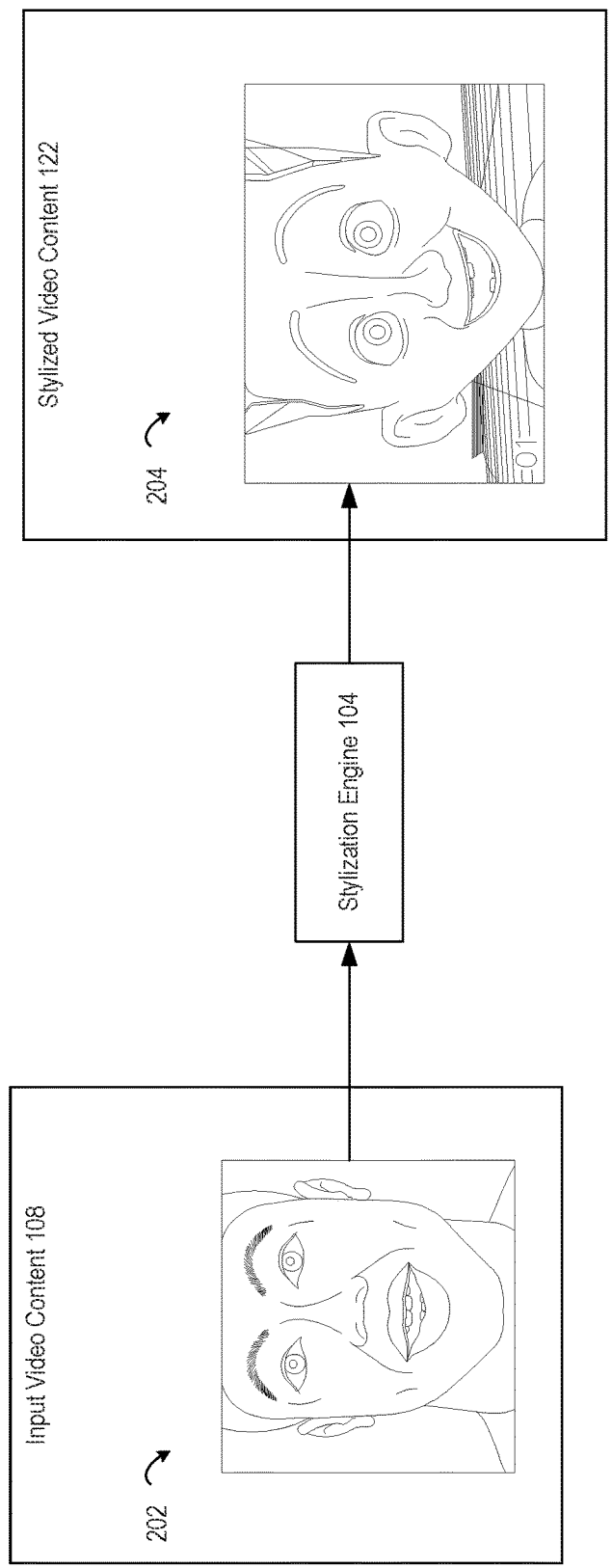
FIG. 2 depicts an example of a frame of input video content that is transformed into a corresponding frame of stylized video content using the system of FIG. 1, according to certain embodiments of the present disclosure.

The stylization engine 104 performs one or more operations that generate stylized video content 122 from the input video content 120. For example, FIG. 2 depicts an example of a frame 202 of input video content 120 that is transformed into a corresponding frame 204 of stylized video content 122 using the video stylization system 100. In FIG. 2, the face depicted in frame 202 depicts a facial expression that includes a smiling and open mouth, slightly widened eyes, and slightly raised eyebrows. The frame 204, which is a stylized version of the frame 202, depicts this facial expression with exaggerations in the smile (e.g., by widening the smile) and the eyebrows (e.g., by sharpening the arch of the raised eyebrows). Returning to the example depicted in FIG. 1, the stylization engine 104 performs these transformative stylization operations using, in some embodiments, one or more of a pre-processing engine 106, one or more stylization filters 108, and a collision reduction engine 116.

The pre-processing engine 106 derives useful features, such as three-dimensional ("3D") facial landmark coordinates and facial orientation data, from input video content 120. In some embodiments, the pre-processing engine 106 performs one or more operations that extract the 3D facial landmark coordinates, facial orientation data, and camera focal length and processes this extracted data to reduce errors that may result from head movements during the video capture process. Examples of these operations are further described herein with respect to FIGS. 3-5.

The stylization filters 108 generate stylized facial landmark data, which modifies the facial expressions from the original facial landmark data such that facial expressions are exaggerated, distorted, or otherwise made more expressive in the stylized video content 122 as compared to the input video content 120. Examples of the stylization filters 108 include (but are not limited to) an anticipation/follow-through filter 110, slow-in/slow-out filter 112, and image warping filter 114, examples of which are described herein with respect to FIGS. 3 and 8-10.

The collision reduction engine 116 performs one or more operations that remove collisions between trajectories in stylized video content. For instance, the collision reduction engine 116 identifies the trajectories of different landmark points in stylized video data, determines that collisions (e.g., overlaps or other intersections) occur between at least two trajectories, and attempts to remove these collisions by modifying one or more stylization parameters used by the stylization filters 108. In some embodiments, the collision-avoidance is used to remove or reduce new collisions introduced by one or more stylization filters 108. For instance, if the input video content 120 depicts biting an upper lip and thereby placing the lower lip over the upper, this depiction would involve a collision between facial landmark coordinates for the "upper lip" feature and the "lower lip" feature. In this case, the collision reduction engine 116 could exclude that existing collision (i.e., the collision from the input video content 120) from a collision-reduction process, thereby preserving the existing collision. Examples of these collision-reduction operations are further described herein with respect to FIGS. 3 and 8-10.

For illustrative purposes, FIG. 1 depicts a single video stylization system 100 that includes a computing device 102, a video content store 118, and a presentation device 124. In some embodiments, the single video stylization system 100 can be a server system that includes some or all of these devices. But other implementations are possible. For instance, a server system could include a first computing device 102 (or group of devices) that executes the pre-processing engine 106 and thereby computes at least some facial landmark data and stores this data in the video content store 118 or another suitable data structure. A client computing device could include a second computing device 102 (or group of devices), which executes the stylization engine 104, and the presentation device 124. The client computing device could apply one or more stylization filters 108 and execute the collision reduction engine 116 to the pre-computed facial landmark data that is accessed from the video content store 118 (or other suitable data structure) via a data network.

Examples of Operations for Video Stylization with Collision Avoidance

Figure 3:
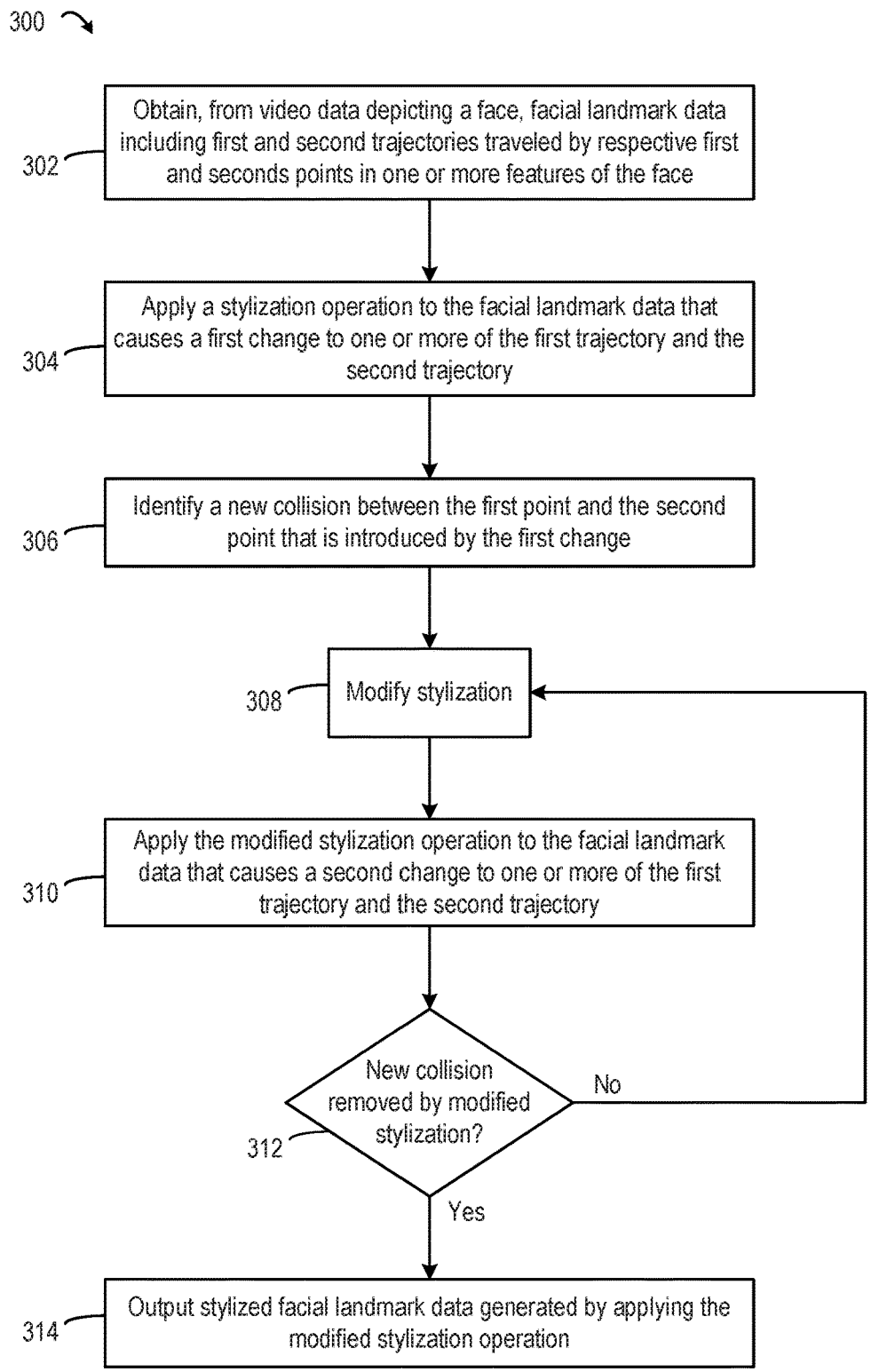
FIG. 3 depicts an example of a process for reducing collision-based defects in stylization of video content depicting faces, according to certain embodiments of the present disclosure.

FIG. 3 depicts an example of a process 300, which may be performed by the video stylization system 100 or another suitable computing system, for reducing collision-based defects in stylization of video content depicting faces. In some embodiments, one or more computing devices 102 implement operations depicted in FIG. 3 by executing suitable program code (e.g., the stylization engine 104). For illustrative purposes, the process 300 is described with reference to certain examples depicted in the figures. Other implementations, however, are possible.

At block 302, the process 300 involves obtaining, from video data depicting a face, facial landmark data including first and second trajectories traveled by respective first and second points in one or more features of the face. One or more computing devices 102 execute program code from the stylization engine 104 to implement block 302. The stylization accesses input video content 120 and computes or retrieves facial landmark data for the input video content 120. In the facial landmark data, groups of points (i.e., landmarks) are associated with semantic features of a face. For instance, landmark points 1-5 are identified as defining a "right eye" feature, landmark points 6-10 are identified as defining a "left eye" feature, etc.

In some embodiments, the stylization engine 104 obtains input video content 120 by communicating, via a data bus, suitable signals between a local non-transitory computer-readable medium (e.g., a memory device storing a video file) and a local computing device 102. In additional or alternative embodiments, the stylization engine 104 obtains input video content 120 by communicating, via a data network, suitable signals between a computing system that includes the non-transitory computer-readable medium and a computing system that includes the computing device 102. For instance, the local computing device 102 can access a camera stream or video file from a remote computing device.

FIG. 4 depicts an example of input facial landmark data 400 from a frame 202 of the input video content used by the process 300. The computing device 102 or another suitable computing system (e.g., a motion-capture system) generates the input facial landmark data 400 from input video content 120. In some embodiments, face tracking is used to automatically detect and track input facial landmark data 400 from the input video content 120. The input facial landmark data 400 includes various points 402 that define various features of a face. For instance, the point 403 is included in a subset of the points 402 that define the "mouth" feature of the face depicted in the frame 202. The input facial landmark data 400 includes a different set of points 402 for each frame of the input video content 120. When the set of frames of the input video content 120 is considered together, a given point 403 changes positions over time. These changed positions for the point 403 constitute a trajectory 404. The input facial landmark data 400 thereby identifies trajectories traveled by multiple points 402 as a facial expression changes during playback of the input video content 120.

In some embodiments, block 302 involves the pre-processing engine 106 performing various corrective operations in conjunction with the operations of the process 300 described above. For instance, a head movement that occurs in between frames can introduce undesired errors in the coordinates of various points 402 in the input facial landmark data 400. To correct or reduce these errors, the pre-processing engine 106 modifies, prior to application of a stylization filter, the input facial landmark data 400 based on a combination of 3D facial landmark coordinates, facial orientation data, and camera focal length.

In one example, the pre-processing engine 106 computes, for a set of frames in the input video content 120, 3D facial landmark coordinates and facial orientation data. An example of the facial orientation data is a 3D rotation matrix and a translation vector for the face with respect to a camera that captured the input video content 120. To compensate for a head movement, the pre-processing engine 106 uses the facial orientation data to cancel out head rotation, head translation, or both. For instance, the pre-processing engine 106 detects a head rotation depicted by a change in the facial orientation data between first and second frames from the set of frames in the input video content 120. The pre-processing engine 106 removes the head rotation by subtracting the translation vector from a subset of the 3D facial landmark coordinates for the first frame or the second frame, applying an inverse of the 3D rotation matrix to the subset of the 3D facial landmark coordinates, or both. FIG. 5 depicts an example of corrected face orientation data resulting from these operations, where a first trajectory 502 of a given point is changed to a second trajectory 504 by adjusting for face orientation. These operations, in combination, generate a set of corrected 3D coordinates for further stylization.

In some embodiments, the pre-processing engine 106 generates two-dimensional ("2D") coordinate groups by projecting 3D coordinates from one or more frames of the input video data into a 2D image space. The 3D coordinates can be original 3D coordinates, corrected 3D coordinates, or some combination thereof from the frames of the input video data. In the examples of FIGS. 3 and 4, the first and second points from block 302 are included in one or more 2D coordinate groups, such as the set of points 402. The pre-processing engine 106 generates, computes, or otherwise identifies the set of trajectories in the facial landmark data (e.g., the first and second trajectories from block 302, a trajectory 404, etc.) by stacking the 2D coordinate groups. Stacking the 2D frames can include, for example, ordering the 2D coordinate groups along a time dimension. For instance, a 2D coordinate group generated from a frame of input video content at time index $t_1$ is the first coordinate group in the stack, a 2D coordinate group generated from a frame of input video content at time index $t_2$ is the second coordinate group in the stack, and so on.

Returning to FIG. 3, at block 304, the process 300 involves applying a stylization operation to the facial landmark data that causes a first change to one or more of the first trajectory and the second trajectory. One or more computing devices 102 execute program code from the stylization engine 104 to implement block 304. For instance, a computing device 102 could apply one or more of the stylization filters 108 to the set of facial landmark data obtained at block 302. Applying a stylization filter 108 changes at least one trajectory of a point in the facial landmark data, thereby generating stylized facial landmark data.

Figure 6:
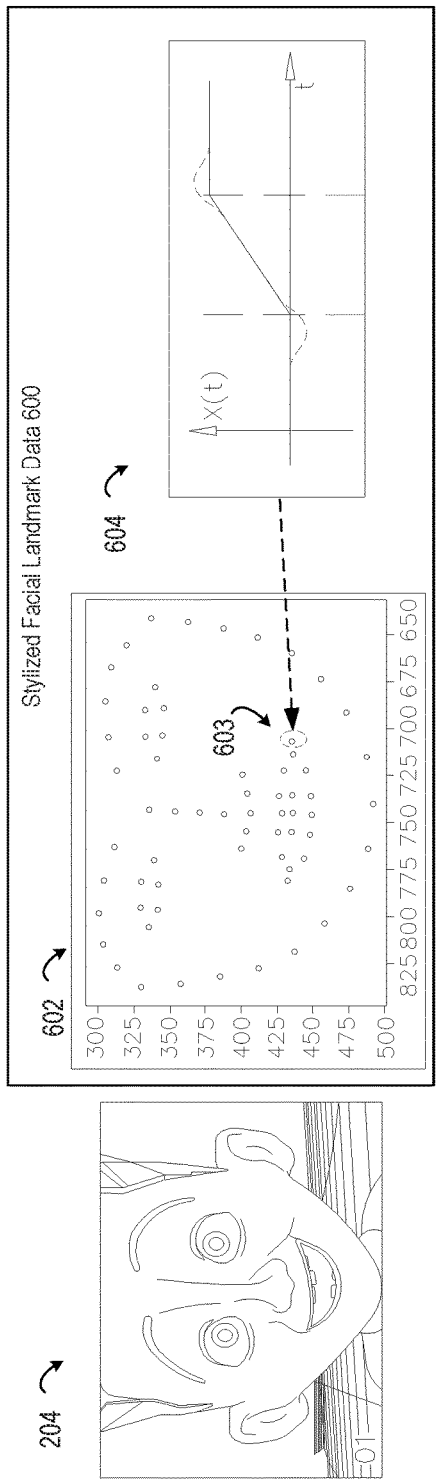
FIG. 6 depicts an example of stylized facial landmark data from stylized video content generated by the process of FIG. 3 from the input facial landmark data of FIG. 4, according to certain embodiments of the present disclosure.

For instance, FIG. 6 depicts an example of stylized facial landmark data 600 generated from the input facial landmark data 400 of FIG. 4. The computing device 102 generates the stylized facial landmark data 600 by, for example, changing a trajectory 404 from the input facial landmark data 400 into a modified trajectory 604. For a particular frame 204 of the stylized video data, the modified trajectory 604 changes positions of one or more points 602 that correspond to points 402 from the frame 202. In this example, the position of a point 603 has changed with respect to the corresponding point 403 from the input facial landmark data 400. The change in position of this point (among others) causes an exaggeration of the smile depicted in frame 204 as compared to the smile depicted in frame 202.

Returning to FIG. 3, at block 306, the process 300 involves identifying a new collision between the first point and the second point that is introduced by the first change. One or more computing devices 102 execute program code from the stylization engine 104 to implement block 306. For instance, the collision reduction engine 116 compares one or more trajectories from the stylized video content, such as the trajectory 603 from FIG. 6, to one or more corresponding trajectories from the input video content 120, such as the trajectory 404 from FIG. 4. The collision reduction engine 116 determines, from this comparison, if a new collision has been introduced by changes to one or more trajectories between the input facial landmark data 400 and the stylized facial landmark data 600.

Figure 7:
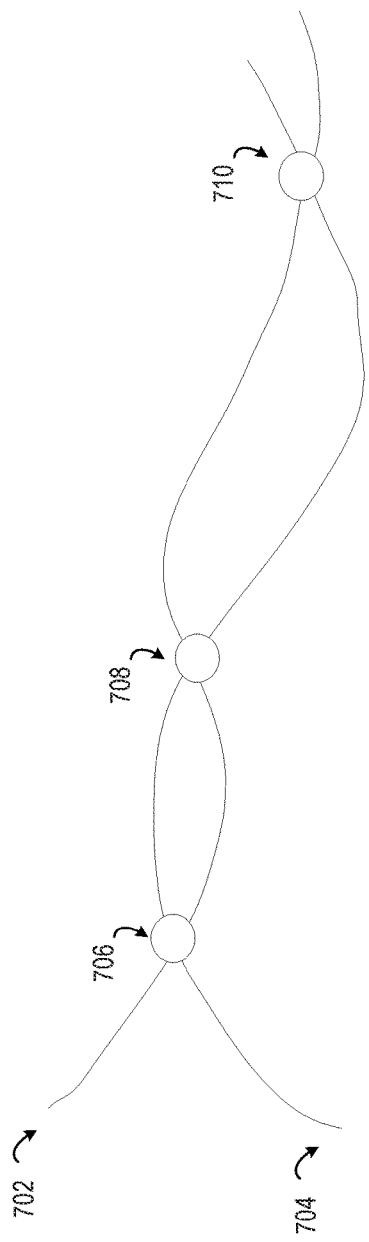
FIG. 7 depicts examples of collisions between trajectories in stylized facial landmark data that are removed in the process depicted by FIG. 3, according to certain embodiments of the present disclosure.

FIG. 7 depicts examples of collisions between trajectories in stylized facial landmark data that are removed in the process 300. In this example, trajectories 702 and 704 are included in stylized facial landmark data. The trajectory 702 intersects or overlaps the trajectory 704 at locations 706, 708, and 710. The collision reduction engine 116 identifies these locations 706, 708, and 710 at respective points in time $t_1$, $t_2$, and $t_3$ as collisions.

In some embodiments, the collision reduction engine 116 distinguishes between new collisions introduced by the stylization from existing collisions included in the input facial landmark data. For instance, the collision reduction engine 116 (or other program code of the stylization engine 104) could determine that the input facial landmark data includes a collision between two trajectories at time $t_1$. The collision reduction engine 116 (or other program code of the stylization engine 104) generates and stores data flagging this collision as an existing collision. At block 306, the collision reduction engine 116 identifies a collision at location 706 between two corresponding trajectories at time $t_1$. Because the existing collision has been flagged for the original trajectories at time $t_1$, the collision reduction engine 116 determines that no corrective action should be taken to remove the collision at location 706. Conversely, the collision reduction engine 116 determines that the collisions at locations 708 and 710 for the two modified trajectories at times $t_2$ and $t_3$ do not have corresponding collisions in the input video content that are flagged as "existing" collisions. Therefore, the collision reduction engine 116 takes one or more corrective actions to remove these new collisions.

Returning to FIG. 3, at block 308, the process 300 involves modifying the stylization operation. One or more computing devices 102 execute program code from the stylization engine 104 to implement block 308. For instance, the collision reduction engine 116 modifies one or more stylization parameters that affect the location of certain points along the modified trajectories. In some embodiments, the stylization parameters are modified automatically (e.g., by decreasing one or more specified parameter values by a specified increment, by increasing one or more specified parameter values by a specified increment, or some combination thereof). In additional or alternative embodiments, the stylization parameters are modified responsive to user input. For instance, if the collision reduction engine 116 identifies a new collision, the stylization engine 104 configures the computing device 102 to present a graphical interface via a presentation device. The graphical interface indicates that the new collision has been detected and provides one or more control elements (e.g., menus, fields, etc.) that can receive input specifying a change in a stylization parameter. The stylization engine 104 modifies the stylization operation based on input received via these control elements. Examples of stylization parameters specific to certain stylization filters 108 are described herein with respect to FIGS. 8-10.

At block 310, the process 300 involves applying the modified stylization operation to the facial landmark data that causes a second change to one or more of the first trajectory and the second trajectory. One or more computing devices 102 execute program code from the stylization engine 104 to implement block 310. For example, the stylization engine 104 applies one or more of the stylization filters 108 using the modified parameters from block 308.

At block 312, the process 300 involves determining whether the new collision identified at block 306 is removed by the modified stylization operation. One or more computing devices 102 execute program code from the stylization engine 104 to implement block 312. For instance, the collision reduction engine 116 compares the new stylized facial landmark data generated at block 310 to the input facial landmark data. The collision reduction engine 116 determines if one or more collisions in the new stylized facial landmark data are absent from the input facial landmark data. This determination is performed in a manner similar to block 306. If the new collision identified is not removed by the modified stylization operation (i.e., the new stylized facial landmark data still includes a new collision), the process 300 returns to block 308 and iterates.

In some embodiments, the collision reduction engine 116 performs additional or alternative operations to reduce collisions. In one example, the collision reduction engine 116 attenuates the power of one or more stylization filters 108 based on the distance between landmark points. Points that are within a threshold distance of one another may be excluded from a filtering process. For instance, the stylization engine 104 could group facial landmark points into five feature groups: a "Mouth" Group, an "Eye" Group, a "Nose" group, a "Brow" Group, and a "Jaw" group. The collision reduction engine 116 determines a set of points that could potentially collide after a stylization is applied. In this example, points from the "Mouth" and "Nose" groups could be sufficiently close that collisions are more likely to occur with those points. The collision reduction engine 116 computes a distance d between points that could potentially collide at every time index when a stylization filter is applied. The collision reduction engine 116 uses the computed distance d to determine a weight value w. The collision reduction engine 116 multiplies the output of a given stylization filter by the weight w to prevent or reduce collisions. An example of computing the weight value w is given by the following formula:

$$w = \frac{d^2}{1+d^2}.$$

If the new collision identified is not removed by the modified stylization operation, the process 300 moves to block 314. At block 314, the process 300 involves outputting stylized facial landmark data generated by applying the modified stylization operation. One or more computing devices 102 execute program code from the stylization engine 104 to implement block 314. In some embodiments, the stylization engine 104 outputs the stylized facial landmark data by configuring (or otherwise causing) a presentation device 124 to display stylized video content 122 that corresponds to the stylized facial landmark data. In additional or alternative embodiments, the stylization engine 104 outputs the stylized facial landmark data by providing stylized video content 122, the stylized facial landmark data, or both to one or more other applications for further processing.

The stylized trajectories that are outputted at block 314 can be used in different ways. In one example, a virtual stylized character can be animated by rigging the virtual character with a matching set of facial landmarks. This can be seen as a form of stylized puppeteering. In another example, an input video can be stylized by using facial landmarks to fit a 2D or 3D model to the face. Displacing the vertices of the model with the stylized trajectories can warp the input frames of the input video.

In some embodiments, the stylization engine 104 generates stylized video content 122 that corresponds to the stylized facial landmark data by warping the input video content 120. For instance, the stylization engine 104 warps image content in each frame of the input video content to adhere to corresponding filtered coordinates generated by applying the modified version of the stylization operation at block 310. Warping the image content in each 2D frame can include triangulating 2D coordinates from the 2D frame and transformed 2D coordinates generated by the modified stylization operation, determining a transformation between triangles formed from the 2D coordinates and corresponding triangles from the transformed 2D coordinates; and warping each triangle in the 2D frame based on the affine transformation.

In one example, the stylization engine 104 retrieves, for image content in each frame of the input video content 120, original landmark coordinates and transformed coordinates generated by applying one or more stylization filters 108. The stylization engine 104 warps image content in each frame to adhere to the transformed coordinates. To do so, the stylization engine 104 triangulates the original landmark coordinates using a suitable algorithm, such as (but not limited to) a Delaunay triangulation algorithm, thereby generating a first set of triangles for frames of the input video content 120. The stylization engine 104 also triangulates the transformed landmark coordinates using the same triangulation algorithm, thereby generating a second set of triangles used to generate frames of the stylized video content 122. The stylization engine 104 computes, for each triangle in the first set and a corresponding triangle in the second set, a respective affine transformation that transforms the triangle from the first set (i.e., the triangle from input video content 120) into the triangle from the second set (i.e., a deformed triangle generated by the stylization operation). The stylization engine 104 warps the pixels positioned within the triangle from the first set based on the transformation between that triangle and the corresponding triangle from the second set. By repeating this process for some or all triangles generated by the triangulation algorithm, the stylization engine 104 generates the set of stylized of frames that constitute the stylized video content 122.

In some embodiments, the stylization engine 104 can use pre-computed stylization parameters that have been learned from training video content. For example, the stylization engine 104 (or a training engine executed on a computing device) can access training data that includes stylized training videos and baseline training videos. A stylized training video could depict a character (e.g., an actor or other individual) performing a first facial expression corresponding to a stylized output (e.g., exaggerating certain facial expressions). A baseline training video could depict the same character (or a sufficiently similar character) performing a second facial expression corresponding to a non-stylized output (e.g., non-exaggerated versions of the facial expression).

Continuing with this example, the computing device applies an optimization to the stylized training videos and baseline training videos, where the optimization configures a stylization operation (e.g., one or more of the stylization filters 108) to transform each baseline training video into a corresponding stylized training video. Additionally or alternatively, a baseline could be statistically determined or otherwise learned from various exemplars. The computing device extracts one or more stylization parameter values from this optimized stylization operation. In some embodiments, the extracted parameter values can be used in the process 300 as initial parameter values at block 304 that are subsequently adjusted via the iteration of blocks 308-312. In other embodiments, the extracted parameter values can be used in the process 300 as modified parameter values at block 308 after default parameter values used at block 304 have resulted in a new collision.

Examples of Stylization Operations

Figure 9:
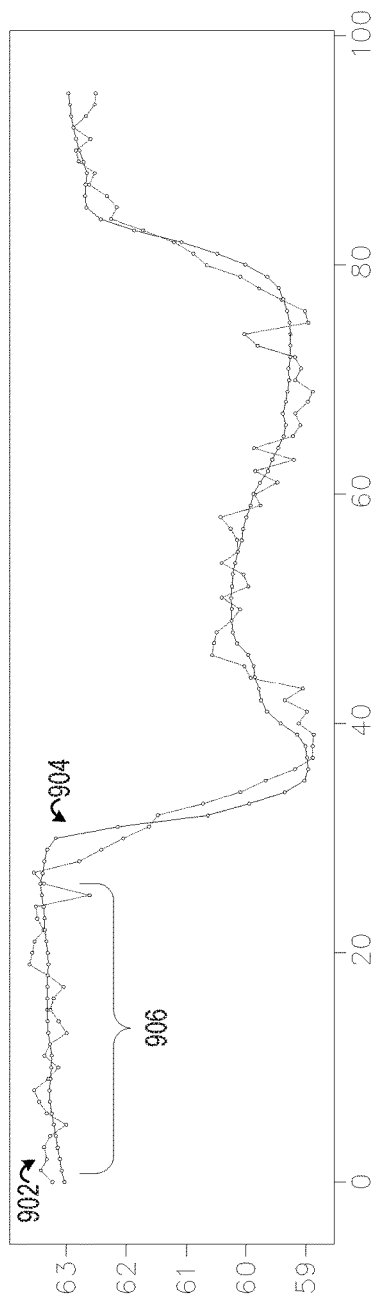
FIG. 9 depicts an example of a trajectory as modified by a slow-in/slow-out filter of a stylization operation from the process depicted by FIG. 3, according to certain embodiments of the present disclosure.
Figure 10:
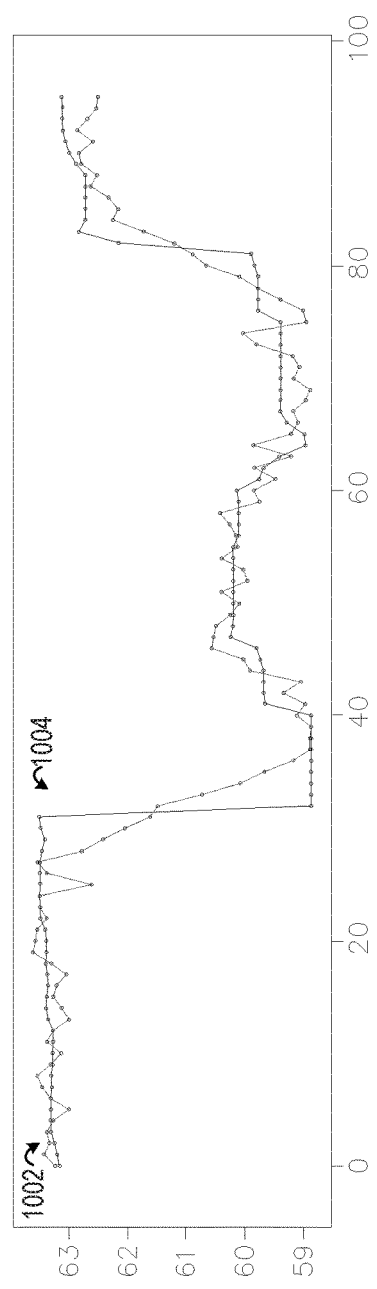
FIG. 10 depicts an example of a trajectory as modified by a motion-stopping effect generated by a slow-in/slow-out filter, according to certain embodiments of the present disclosure.

Any suitable stylization operations can be used in the process 300. For instance, FIGS. 8-10 depict various examples of stylization operations applied by the video stylization system 100.

Figure 8:
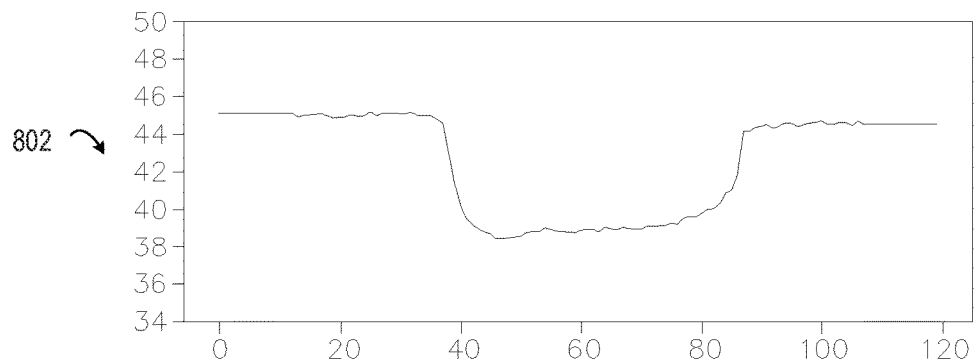
FIG. 8 depicts an example of a trajectory as modified by an anticipation/follow-through filter of a stylization operation from the process depicted by FIG. 3, according to certain embodiments of the present disclosure.
Figure 8:
Figure 8:
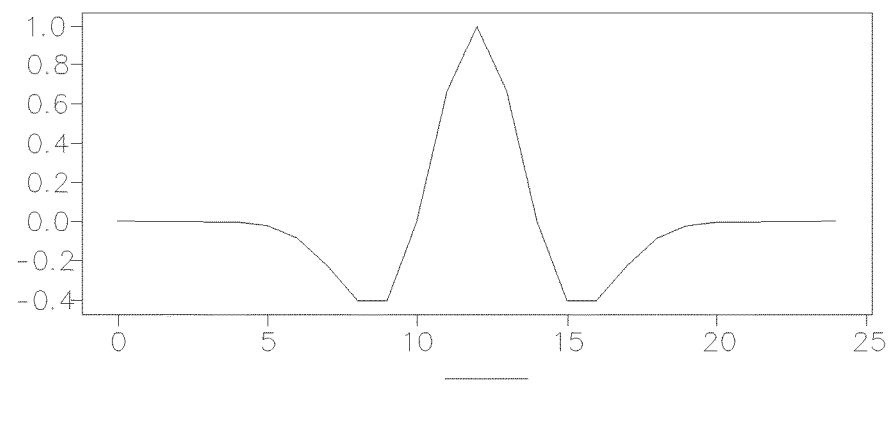
Figure 8:
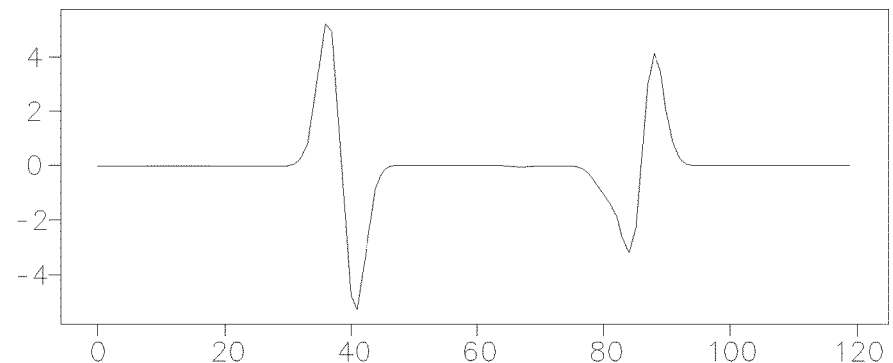

FIG. 8 depicts an example of an anticipation/follow-through effect that could be applied in a stylization operation. The anticipation/follow-through filter 110 creates an effect in which a certain object, which moves along a path in an input video, performs one or more actions that indicate anticipation of movement at the start of the path (e.g., leaning back prior to commencing movement), follow-through movement at the end of the path (e.g., leaning slightly forward after ceasing at the end of the path), or both.

In some embodiments, the anticipation/follow-through filter 110 involves using a Laplacian of a Gaussian ("LoG") filter having a configurable weight. The stylization engine 104 does so by applying the LoG filter with the configurable weight to a given trajectory (e.g., the first and second trajectories in blocks 304 and 310 of the process 300). For example, in FIG. 8, trajectory 802 is a trajectory prior to application of an LoG filter, and trajectory 804 results from applying the LoG filter to the trajectory 802. Anticipation and follow-through are byproducts of the negative lobes in the LoG filter.

The stylization engine 104 subtracts the given trajectory as modified by applying the LoG filter (e.g., trajectory 804) from the trajectory prior to the applying the LoG filter (e.g., trajectory 802). This results in the modified trajectory 806 generated by the anticipation/follow-through filter 110.

To implement the corrective operations in process 300 (i.e., modifying a stylization at block 308), the configurable weight of the LoG filter is modified between iterations. In one example, the weight is the power of the filter as defined by the standard deviation of the Gaussian. In another example, the weight is an additional weight applied to an output of the LoG filter. The weights from one or more of these examples can be modified to avoid collisions based on a used input, automatically selected, or some combination thereof.

FIG. 9 depicts an example of a slow-in/slow-out effect that could be applied in a stylization operation. The slow-in/slow-out filter 112 is a non-linear, smoothing filter, similar in design to a bilateral filter, that concentrates the motion of a given animated sequence around key frames for a stylized effect. In one example, the slow-in/slow-out filter 112 preserves an original motion duration by speeding up the timing of in-between frames. In another example, the slow-in/slow-out filter 112 preserves the timing of in-between motions, thereby resulting in a stylized clip of longer duration. An example of a slow-in/slow-out filter is described in Y. Kwon et al., "An Animation Bilateral Filter for Slow-In and Slow-Out Effects," *Graphical Models*, 73(5):141-150 (2011).

In some embodiments, the slow-in/slow-out filter 112, replaces each coordinate value along a trajectory (e.g., the first and second trajectories in blocks 304 and 310 of the process 300) with a weighted average of coordinate values in a respective neighborhood of the coordinate value. For instance, FIG. 9 depicts an initial trajectory 902 that is smoothed by applying the slow-in/slow-out filter 112. The smoothing operation removes or decreases the amount of movement in certain portions of the trajectory, as indicated by the modified trajectory 904. For instance, while both trajectories 902 and 904 involve minor movements along a vertical axis in portion 906, these movements are greatly attenuated in the modified trajectory 904 (i.e., by removing a "jitter" from the trajectory 902). Furthermore, FIG. 10 depicts an example of a motion-stopping effect generated using a slow-in/slow-out filter 112. In FIG. 10, the parameters of the slow-in/slow-out filter 112 have been adjusted such that the trajectory 1002 is transformed into a nearly step-wise trajectory 1004.

In one example, the weights used in the weighted average are based on a Gaussian distribution and depend on the distance between coordinates and magnitude of the gradient at a given point along the trajectory. The gradient can be calculated, for example, using a Savitsky-Golay filter that fits low-degree polynomials into subsets of neighboring points.

An example of a formula for implementing the slow-in/slow-out filter 112 is:

$$P(t) = \sum_{t_i \in N} G(\|t - t_i\|) G(P'(t)).$$

In this formula, P(t) is a position of a data point at a frame t, N is a neighborhood around frame t, P'(t) is the derivative of P(t), and G is a Gaussian function. P'(t) can control the strength of the applied effect. For instance, if P'(t)=0, no effect is applied because no transition exists.

To implement the corrective operations in process 300 (i.e., modifying a stylization at block 308), one or more parameters of the slow-in/slow-out filter 112 are modified between iterations. In some embodiments, the neighborhood of each coordinate value is modified. In additional or alternative embodiments, one or more weights used in the weighted average are modified between iterations.

Examples of Devices in a Video Stylization System

Figure 11:
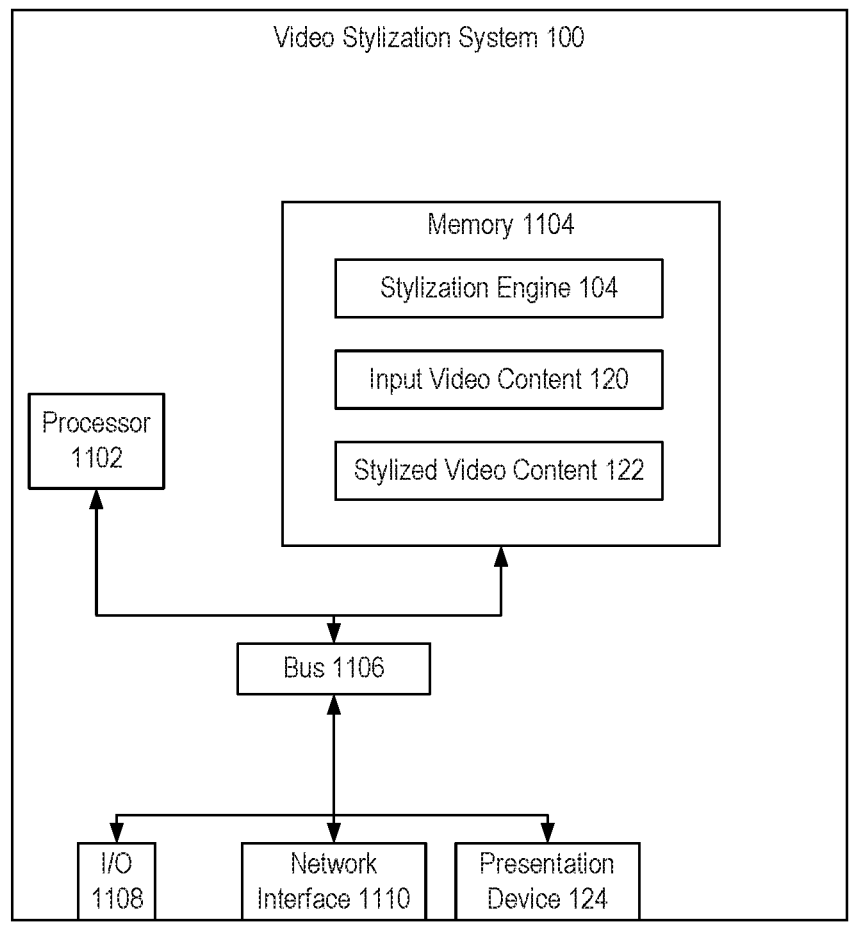
FIG. 11 depicts an example of an implementation of the video stylization system of FIG. 1, according to certain embodiments of the present disclosure.

Any suitable computing system or group of computing systems can be used for performing the operations described herein. For example, FIG. 11 depicts an example of a video stylization system 100. In some embodiments, the video stylization system 100 includes a processing device that executes the stylization engine 104, a memory that stores the video content store 118, and a presentation device 124 that plays video content, as depicted in FIG. 11. In other embodiments, separate computing systems having devices similar to those depicted in FIG. 11 (e.g., a processor, a memory, etc.) execute the stylization engine 104.

The depicted examples of a video stylization system 100 includes a processor 1102 (e.g., the computing device 102 of FIG. 1) communicatively coupled to one or more memory devices 1104. The processor 1102 executes computer-executable program code stored in a memory device 1104, accesses information stored in the memory device 1104, or both. Examples of the processor 1102 include a microprocessor, an application-specific integrated circuit ("ASIC"), a field-programmable gate array ("FPGA"), or any other suitable processing device. The processor 1102 can include any number of processing devices, including a single processing device.

The memory device 1104 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The video stylization system 100 may also include a number of external or internal devices, such as input or output devices. For example, the video stylization system 100 is shown with one or more input/output ("I/O") interfaces 1108. An I/O interface 1108 can receive input from input devices or provide output to output devices. One or more buses 1106 are also included in the video stylization system 100. The bus 1106 communicatively couples one or more components of a respective one of the video stylization system 100.

The video stylization system 100 executes program code that configures the processor 1102 to perform one or more of the operations described herein. The program code includes, for example, the stylization engine 104, a video playback application, or other suitable applications that perform one or more operations described herein. The program code may be resident in the memory device 1104 or any suitable computer-readable medium and may be executed by the processor 1102 or any other suitable processor. In some embodiments, all modules in the stylization engine 104 (e.g., the pre-processing engine 106, the stylization filters 108, etc.) are stored in the memory device 1104, as depicted in FIG. 11. In additional or alternative embodiments, one or more of these modules from the stylization engine 104 are stored in different memory devices of different computing systems. In additional or alternative embodiments, the program code described above is stored in one or more other memory devices accessible via a data network.

The video stylization system 100 can access the input video content 120 and the stylized video content 122 in any suitable manner. In some embodiments, one or more of these data sets and engines are stored in the same memory device (e.g., one or more memory devices 1104), as in the example depicted in FIG. 11. In additional or alternative embodiments, one or more of the data sets and engines described herein are stored in one or more other memory devices accessible via a data network. For example, a video stylization system 100 that executes the pre-processing engine 106 to generate the stylized video content 122 can provide access to the stylized video content 122 by external systems that execute the stylization engine 104. Furthermore, input video content 120 that is associated with the stylized video content 122 can be stored in the same memory device as the stylized video content 122, as depicted in FIG. 11, or stored in a remote memory device from an independent video content system.

In some embodiments, the video stylization system 100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The video stylization system 100 is able to communicate with one or more other computing devices (e.g., a computing device executing an stylization engine 104) via a data network using the network interface device 1110.

In some embodiments, the video stylization system 100 also includes the presentation device 124 depicted in FIG. 11. A presentation device 124 can include any device or group of devices suitable for providing visual, auditory, or other suitable sensory output. Non-limiting examples of the presentation device 124 include a touchscreen, a monitor, a speaker, a separate mobile computing device, etc. In some aspects, the presentation device 124 can include a remote client-computing device that communicates with the video stylization system 100 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes one or more processing devices performing operations comprising:
    obtaining facial landmark data from video data depicting a face, wherein the facial landmark data comprises a first trajectory traveled by a first point in one or more features of the face and a second trajectory traveled by a second point in one or more features of the face;
    applying a stylization operation to the facial landmark data that causes a first change to one or more of the first trajectory and the second trajectory;
    identifying a new collision between the first point and the second point that is introduced by the first change;
    applying a modified version of the stylization operation to the facial landmark data that causes a second change to one or more of the first trajectory and the second trajectory;
    determining that the new collision is removed by the second change; and
    outputting the facial landmark data with the modified version of the stylization operation applied.

2. The method of claim 1, the operations further comprising extracting, prior to applying the stylization operation, the one or more features of the face by performing additional operations comprising:
    computing, for a set of frames in the video data, three-dimensional ("3D") facial landmark coordinates and facial orientation data, wherein the facial orientation data comprises a 3D rotation matrix and a translation vector for the face with respect to a camera that captured the video data;
    generating corrected 3D coordinates by:
        detecting a head rotation comprising a change in the facial orientation data between a first frame from the set of frames and a second frame from the set of frames, and
        removing the head rotation by (i) subtracting the translation vector from a subset of the 3D facial landmark coordinates for the first frame or the second frame and (ii) applying an inverse of the 3D rotation matrix to the subset of the 3D facial landmark coordinates;
    generating two-dimensional ("2D") coordinate groups by projecting, for each frame in the set of frames, the corrected 3D coordinates to a 2D image space; and
    generating a set of trajectories for the one or more features of the face by ordering the 2D coordinate groups along a time dimension, wherein the 2D coordinate groups include the first point and the second point; and
    outputting the set of trajectories that includes the first trajectory and the second trajectory.

3. The method of claim 2, wherein outputting the facial landmark data with the modified version of the stylization operation applied comprises warping image content in each 2D frame to adhere to corresponding filtered coordinates generated by applying the modified version of the stylization operation, wherein warping the image content in each 2D frame comprises:
    triangulating 2D coordinates from the 2D frame and transformed 2D coordinates generated by the modified version of the stylization operation;
    determining an affine transformation between triangles formed from the 2D coordinates and corresponding triangles from the transformed 2D coordinates; and
    warping each triangle in the 2D frame based on the affine transformation.

4. The method of claim 1, wherein applying the stylization operation comprises creating an anticipation/follow-through effect using a Laplacian of a Gaussian ("LoG") filter having an initial value of a configurable weight and applying the modified version of the stylization operation comprises using the LoG filter with a modified value of the configurable weight,
    wherein creating the anticipation/follow-through effect using the LoG filter comprises (i) applying the LoG filter with the configurable weight to the first trajectory and the second trajectory and (ii) subtracting the first trajectory with the LoG filter applied from the first trajectory and subtracting the second trajectory with the LoG filter applied from the second trajectory.

5. The method of claim 1, wherein applying the stylization operation comprises, for each trajectory of the first trajectory and the second trajectory, creating a slow-in/slow-out effect by replacing each coordinate value along the trajectory with a weighted average of coordinate values in a respective neighborhood of the coordinate value, wherein applying the modified version of the stylization operation comprises modifying one or more of (i) the respective neighborhood of each coordinate value and (ii) a weight used in the weighted average.

6. The method of claim 1, the operations further comprising:
    determining that a distance between a third point in the one or more features of the face is within a threshold distance of one or more of the first point and the second point; and
    excluding the third point from the stylization operation based on the distance being within the threshold distance.

7. The method of claim 1, wherein applying the stylization operation that causes the first change comprises applying the stylization operation with one or more first stylization parameter values and applying the modified version of the stylization operation that causes the second change comprises applying the stylization operation with one or more second stylization parameter values,
    wherein the method further comprises learning the one or more first stylization parameter values by performing training operations comprising:
        accessing a stylized training video depicting a character performing a first facial expression corresponding to a stylized output and a baseline training video depicting the character performing a second facial expression corresponding to a non-stylized output,
        applying an optimization to the stylized training video and the baseline training video, wherein the optimization configures the stylization operation to transform the baseline training video into the stylized training video, and extracting the one or more first stylization parameter values from the stylization operation configured via the optimization.

8. A system comprising:
a processing device; and
a non-transitory computer-readable medium communicatively coupled to the processing device, wherein the processing device is configured to execute program code stored in the non-transitory computer-readable medium and thereby perform operations comprising:
obtaining facial landmark data from video data depicting a face, wherein the facial landmark data comprises a first trajectory traveled by a first point in one or more features of the face and a second trajectory traveled by a second point in one or more features of the face,
applying a stylization operation to the facial landmark data that causes a first change to one or more of the first trajectory and the second trajectory,
identifying a new collision between the first point and the second point that is introduced by the first change,
applying a modified version of the stylization operation to the facial landmark data that causes a second change to one or more of the first trajectory and the second trajectory,
determining that the new collision is removed by the second change, and
outputting the facial landmark data with the modified version of the stylization operation applied.

9. The system of claim 8, the operations further comprising extracting, prior to applying the stylization operation, the one or more features of the face by performing additional operations comprising:
computing, for a set of frames in the video data, three-dimensional ("3D") facial landmark coordinates and facial orientation data, wherein the facial orientation data comprises a 3D rotation matrix and a translation vector for the face with respect to a camera that captured the video data;
generating corrected 3D coordinates by:
detecting a head rotation comprising a change in the facial orientation data between a first frame from the set of frames and a second frame from the set of frames, and
removing the head rotation by (i) subtracting the translation vector from a subset of the 3D facial landmark coordinates for the first frame or the second frame and (ii) applying an inverse of the 3D rotation matrix to the subset of the 3D facial landmark coordinates;
generating two-dimensional ("2D") coordinate groups by projecting, for each frame in the set of frames, the corrected 3D coordinates to a 2D image space; and
generating a set of trajectories for the one or more features of the face by ordering the 2D coordinate groups along a time dimension, wherein the 2D coordinate groups include the first point and the second point; and
outputting the set of trajectories that includes the first trajectory and the second trajectory.

10. The system of claim 9, wherein outputting the facial landmark data with the modified version of the stylization operation applied comprises warping image content in each 2D frame to adhere to corresponding filtered coordinates generated by applying the modified version of the stylization operation, wherein warping the image content in each 2D frame comprises:

triangulating 2D coordinates from the 2D frame and transformed 2D coordinates generated by the modified version of the stylization operation;
determining an affine transformation between triangles formed from the 2D coordinates and corresponding triangles from the transformed 2D coordinates; and
warping each triangle in the 2D frame based on the affine transformation.

11. The system of claim 8, wherein applying the stylization operation comprises creating an anticipation/follow-through effect using a Laplacian of a Gaussian ("LoG") filter having an initial value of a configurable weight and applying the modified version of the stylization operation comprises using the LoG filter with a modified value of the configurable weight,
wherein creating the anticipation/follow-through effect using the LoG filter comprises (i) applying the LoG filter with the configurable weight to the first trajectory and the second trajectory and (ii) subtracting the first trajectory with the LoG filter applied from the first trajectory and subtracting the second trajectory with the LoG filter applied from the second trajectory.

12. The system of claim 8, wherein applying the stylization operation comprises, for each trajectory of the first trajectory and the second trajectory, creating a slow-in/slow-out effect by replacing each coordinate value along the trajectory with a weighted average of coordinate values in a respective neighborhood of the coordinate value, wherein applying the modified version of the stylization operation comprises modifying one or more of (i) the respective neighborhood of each coordinate value and (ii) a weight used in the weighted average.

13. The system of claim 8, the operations further comprising:
determining that a distance between a third point in the one or more features of the face is within a threshold distance of one or more of the first point and the second point; and
excluding the third point from the stylization operation based on the distance being within the threshold distance.

14. The system of claim 8, wherein applying the stylization operation that causes the first change comprises applying the stylization operation with one or more first stylization parameter values and applying the modified version of the stylization operation that causes the second change comprises applying the stylization operation with one or more second stylization parameter values,
wherein the operations further comprise learning the one or more first stylization parameter values by performing training operations comprising:
accessing a stylized training video depicting a character performing a first facial expression corresponding to a stylized output and a baseline training video depicting the character performing a second facial expression corresponding to a non-stylized output,
applying an optimization to the stylized training video and the baseline training video, wherein the optimization configures the stylization operation to transform the baseline training video into the stylized training video, and
extracting the one or more first stylization parameter values from the stylization operation configured via the optimization.

15. A non-transitory computer-readable medium having program code that is stored thereon, the program code executable by one or more processing devices for performing operations comprising:
- obtaining facial landmark data from video data depicting a face, wherein the facial landmark data comprises a first trajectory traveled by a first point in one or more features of the face and a second trajectory traveled by a second point in one or more features of the face;
- a step for applying a stylization operation to the facial landmark data that causes a first change to one or more of the first trajectory and the second trajectory;
- a step for identifying a new collision between the first point and the second point that is introduced by the first change;
- a step for applying a modified version of the stylization operation to the facial landmark data that causes a second change to one or more of the first trajectory and the second trajectory;
- determining that the new collision is removed by the second change; and
- outputting the facial landmark data with the modified version of the stylization operation applied.

16. The non-transitory computer-readable medium of claim 15, the operations further comprising extracting, prior to applying the stylization operation, the one or more features of the face by performing additional operations comprising:
- computing, for a set of frames in the video data, three-dimensional ("3D") facial landmark coordinates and facial orientation data, wherein the facial orientation data comprises a 3D rotation matrix and a translation vector for the face with respect to a camera that captured the video data;
- generating corrected 3D coordinates by:
  - detecting a head rotation comprising a change in the facial orientation data between a first frame from the set of frames and a second frame from the set of frames, and
  - removing the head rotation by (i) subtracting the translation vector from a subset of the 3D facial landmark coordinates for the first frame or the second frame and (ii) applying an inverse of the 3D rotation matrix to the subset of the 3D facial landmark coordinates;
- generating two-dimensional ("2D") coordinate groups by projecting, for each frame in the set of frames, the corrected 3D coordinates to a 2D image space; and
- generating a set of trajectories for the one or more features of the face by ordering the 2D coordinate groups along a time dimension, wherein the 2D coordinate groups include the first point and the second point; and
- outputting the set of trajectories that includes the first trajectory and the second trajectory.

17. The non-transitory computer-readable medium of claim 15, wherein applying the stylization operation comprises creating an anticipation/follow-through effect using a Laplacian of a Gaussian ("LoG") filter having an initial value of a configurable weight and applying the modified version of the stylization operation comprises using the LoG filter with a modified value of the configurable weight, wherein creating the anticipation/follow-through effect using the LoG filter comprises (i) applying the LoG filter with the configurable weight to the first trajectory and the second trajectory and (ii) subtracting the first trajectory with the LoG filter applied from the first trajectory and subtracting the second trajectory with the LoG filter applied from the second trajectory.

18. The non-transitory computer-readable medium of claim 15, wherein applying the stylization operation comprises, for each trajectory of the first trajectory and the second trajectory, creating a slow-in/slow-out effect by replacing each coordinate value along the trajectory with a weighted average of coordinate values in a respective neighborhood of the coordinate value, wherein applying the modified version of the stylization operation comprises modifying one or more of (i) the respective neighborhood of each coordinate value and (ii) a weight used in the weighted average.

19. The non-transitory computer-readable medium of claim 15, the operations further comprising:
- determining that a distance between a third point in the one or more features of the face is within a threshold distance of one or more of the first point and the second point; and
- excluding the third point from the stylization operation based on the distance being within the threshold distance.

20. The non-transitory computer-readable medium of claim 15, wherein applying the stylization operation that causes the first change comprises applying the stylization operation with one or more first stylization parameter values and applying the modified version of the stylization operation that causes the second change comprises applying the stylization operation with one or more second stylization parameter values,
wherein the operations further comprise learning the one or more first stylization parameter values by performing training operations comprising:
- accessing a stylized training video depicting a character performing a first facial expression corresponding to a stylized output and a baseline training video depicting the character performing a second facial expression corresponding to a non-stylized output,
- applying an optimization to the stylized training video and the baseline training video, wherein the optimization configures the stylization operation to transform the baseline training video into the stylized training video, and
- extracting the one or more first stylization parameter values from the stylization operation configured via the optimization.

* * * * *